United States Patent [19]

Shimoyama et al.

[11] Patent Number: 5,185,644
[45] Date of Patent: Feb. 9, 1993

[54] SENSOR FOR WATER FILM ON A PLATE IN PRINTING MACHINES

[75] Inventors: Makoto Shimoyama; Ikuo Ozaki, both of Hiroshima, Japan

[73] Assignee: Mitsubishi Jukogyo Kabushiki Kaisha, Tokyo, Japan

[21] Appl. No.: 731,656

[22] Filed: Jul. 17, 1991

[30] Foreign Application Priority Data

Jul. 17, 1990 [JP] Japan .................. 2-187214

[51] Int. Cl.$^5$ .................. G01J 4/00; G01B 11/06
[52] U.S. Cl. .................. 356/369; 356/381; 250/225
[58] Field of Search ............... 356/367, 368, 369, 381, 356/382, 446, 445, 364, 365, 366; 250/225

[56] References Cited

U.S. PATENT DOCUMENTS

| 4,129,781 | 12/1978 | Doyle . | |
| 4,695,162 | 9/1987 | Itonaga et al. | 356/369 |
| 4,850,711 | 7/1989 | Sano et al. | 356/382 |
| 4,872,758 | 10/1989 | Miyazaki et al. | 356/381 |
| 4,906,844 | 3/1990 | Hall | 356/369 |

FOREIGN PATENT DOCUMENTS

| 0062787 | 10/1982 | |
| 0150945 | 8/1985 | |
| 2194115 | 2/1988 | United Kingdom . |

Primary Examiner—Richard A. Rosenberger
Assistant Examiner—Hoa Q. Pham
Attorney, Agent, or Firm—Jacobson, Price, Holman & Stern

[57] ABSTRACT

An on-plate water film sensor for printing machines uses a narrow-band light source, a photo modulator for chopping a light beam therefrom into p- and s-polarized beams, a collimator for making parallel the rays of the collimated beams with a given cross-sectional area for measurement, a wavelength plate for adjusting the wavefront of the parallel rays, a receiver for the light secularly reflected from a plate, and an arithmetic unit to figure out the thickness of a water film formed on the plate based on the intensities of the received beams. Water lining which usually has patterns of narrow width can be detected, and the measurement of a water film thickness can be done with high speed.

5 Claims, 3 Drawing Sheets

SENSOR FOR WATER FILM ON A PLATE IN PRINTING MACHINES

BACKGROUND OF THE INVENTION

1. Field of the Invention

The present invention relates to the detection of a water film formed on certain parts of a printing machine and is applicable likewise to detect a water film or an oil film on steel products or in steel making machines or the like.

2. Description of the Related Art

In a printing machine (comprising a group of ink and water applicator rollers, plates, and various cylinders), the quality of printing is affected by the physical conditions of a water film formed on a plate. FIG. 6 is a schematic diagram of a water film sensor according to a conventional design which detects a water film on a plate 6. With such a sensor, water film detection is carried out as described in the following.

Infrared rays from an infrared light source 15 are gathered by an infrared collector lens 16 and passed through interference filters 22 and 23 disposed on a chopper, whereby a reference light beam and a light beam with an absorption wavelength of water may be selected alternately. Then, the light beams are guided by a photo waveguide 18 and absorbed by the water film on the plate 6, and then the light beams which have passed through the water film and have been reflected from the plate 6 pass through a receiver lens 19 and is converted into signals by a photo sensor element 20. Using a position-detecting means 21 for the interference filters 22, 23, the signals from the photo sensor element 20 are identified. A signal processor 9 is fed with these signals and positional information from the position-detecting means so that the processor may process data and convert them to a water film thickness.

The following are examples of printing quality problems associated with on-plate water films:

(1) Water lining

Water lining is a phenomenon in which a plurality of streaks (varying ink density) with a width of 1.5 mm or less occur.

(2) Web staining

Web staining occurs over a wide area where printing pictures or patterns do not exist (a portion without picture or line) on a plate.

The measurement of water film thickness for the case in paragraph (2) above covers a wide area and can be done with the measurement of the mean water film thickness over the range of stain. Therefore, even if the chopper speed is low, the conventional method of water film thickness measurement is serviceable in this case. However, the area of water film measurement in the case of paragraph (1) above is small, and a high chopper speed is required.

Thus, the prior art described above is confronted with the following problems:

(i) Since the infrared light source is not a point source, it is not possible to reduce the cross-sectional diameter of the light beam to less than 1.5 mm without reducing the intensity of light.

(ii) If the area of measurement for water film thickness is smaller, it then becomes necessary to sample with a high-speed chopper. However, conventional mechanical choppers do not have such a high speed.

SUMMARY OF THE INVENTION

The present invention is characterized by the following features and can resolve the above-mentioned problems.

(1) The area of measurement for the water film thickness can be decreased by using a laser.

(2) A chopper which utilizes electro-optical effects is used as a high-speed chopper.

(3) The amount of a water film is measured by finding the roughness and condition of the plate surface and water thereon by changing the state of polarization of the light beams with an optical modulator.

Namely, in accordance with the present invention, there is provided a sensor for a water film in a printing machine which comprises a narrow-band light source such as a laser or a light emitting diode (LED), an optical modulator which chops a light beam from the light source into a p-polarized and an s-polarized light beams, a collimator which makes parallel the rays of each polarized beam with a given cross-sectional area for measurement, a wavelength plate to adjust the wavefront of the collimated rays, and a device for receiving the specular reflection of the beams from a plate and for calculating the thickness of a water film on a plate.

The sensor of the present invention can deal with the problem of water lining described above as follows: (i) With the use of a laser or an LED, etc. which makes it possible to narrow down the cross-sectional area of a light beam, changes in a water film pattern can be measured; (ii) with a high-speed chopper which electrically switches light using electro-optical effects, the chopper speed can be increased so as to be able to respond to changes in a water film pattern without delay; and (iii) the p- and s-polarized light beams by which the laser is characterized and a certain angle (Brewster angle) entailing special phenomena are further utilized so that the water film can be measured.

DETAILED DESCRIPTION OF THE PREFERRED EMBODIMENT

Referring to FIGS. 1 through 5, a preferred embodiment of the present invention will be described below.

Figure 1:
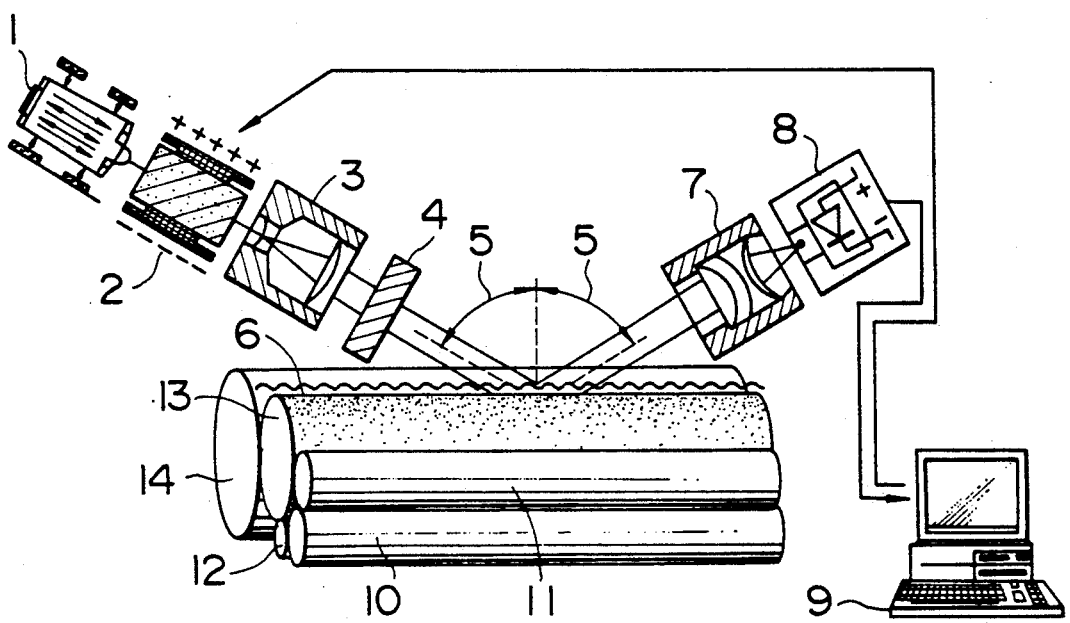
FIG. 1 is a schematic diagram of the on-plate water film sensor in a preferred embodiment of the present invention.

Illustrated in FIG. 1 is one embodiment of the water film sensor according to the present invention.

With reference to FIG. 1, numeral 1 denotes a linearly polarized laser, 2 a photo modulator, 3 a collimator, 4 a ½ wavelength plate, 5 a Brewster angle $\theta$, 6 a plate, 7 a receiver lens, 8 a photo detecting element, 9 a signal processor, 10 an ink roller I, 11 an ink roller II, 12 a water applicator roller, 13 a plate cylinder, and 14 a rubber cylinder.

With a printing machine comprising a group of ink or water rollers 10, 11, 12, . . . , plates and various cylinders, the quality of printing (water lining) is affected by how a water film is formed on the surface of the plate 6. The water film sensor shown in FIG. 1 detects a water film pattern created on the plate 6. The parts 1-8 for detecting water film are grouped into a laser projecting group and a laser receiving group. The parts 1-4 for the projection of laser light and those 7,8 for the reception of light are arranged so that their light projection and receiving axes face and cross one another at a Brewster angle 5 ($\theta$) of water in a plane perpendicular to the plate 6. In the laser projecting group, linearly polarized laser 1 projects a laser beam, and this laser beam subsequently enters the photo modulator 2 and is chopped in different directions of polarization (p- and s-polarization directions) according to a voltage signal which is applied to the photo modulator. Both the p- and s-polarized light beams are collimated to parallel beams having a proper cross-sectional area for the measurement of film thickness by means of the collimator 3. Then, each of the p- and s-polarized light beams is passed through the $\frac{1}{2}$ wavelength plate 4 for adjusting their wavefronts in reference to the plate surface 6, and then illuminates the surface of the plate 6. The light beam (p- or s-polarized light) is, reflected specularly by the plate 6 and converted into voltage signals through the receiver lens 7 and the photo detecting element 8 furnished in the laser receiving group. Then, based on the voltage signals for s- and p-polarized light beams, the signal processor 9 carries out arithmetic operations to calculate the thickness of a water film formed on the plate 6.

A conventional infrared absorption method utilizes the physical properties of water that it absorbs infrared rays at certain wavelengths to measure the thickness of a water film. Whereas, the laser-applied water film sensor according to the present invention measures the thickness of a water film by using special phenomena which occur at a so-called Brewster angle (i.e., the p- and s-polarized light beams propagate in different directions at a water interface). Namely, the present invention utilizes the physical properties of s- and p-polarized light to measure the condition of the water film. S-polarized light is reflected by the surface of the water deposited on the plate, and p-polarized light passes through the surface of the on-plate water without being reflected.

Figure 2:
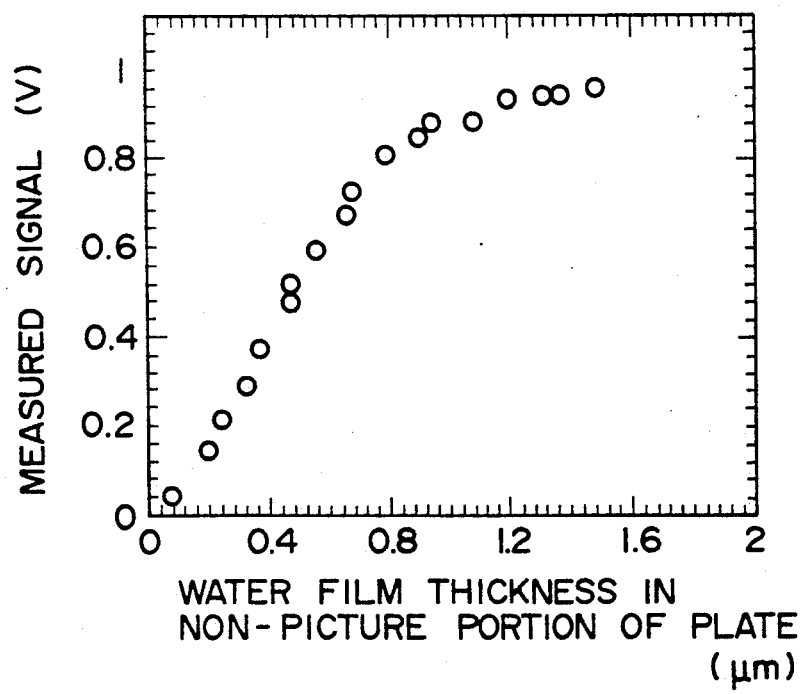
FIG. 2 is a graph of the quantitative measurement of a water film on a non-printing portion (portion without any picture or lines) of a plate, using the water film sensor of FIG. 1.
Figure 3:
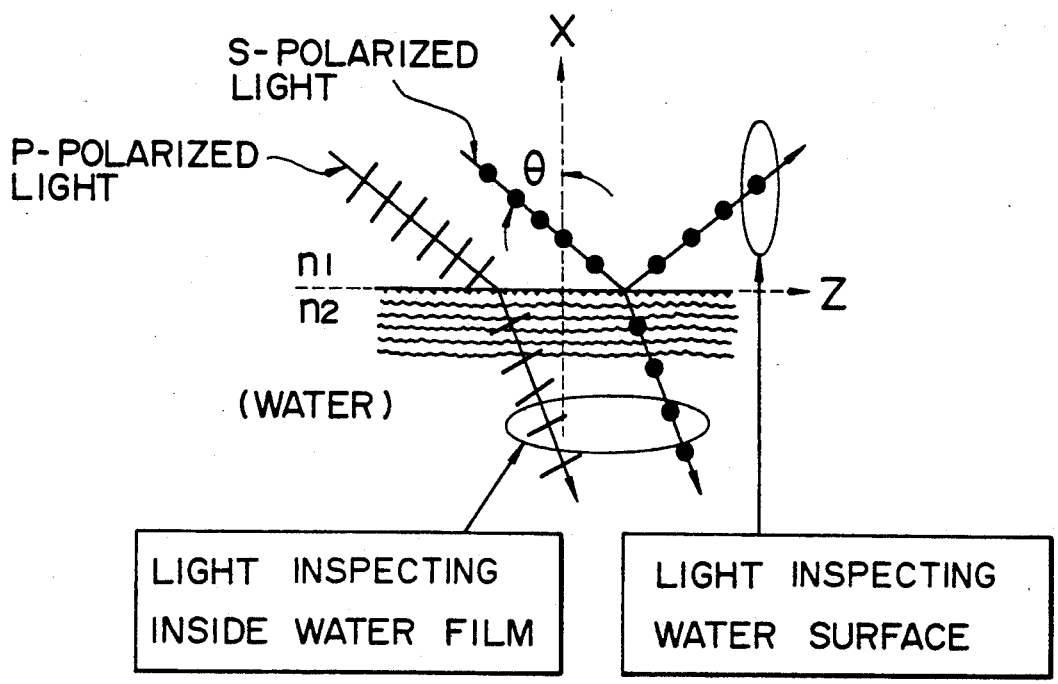
FIG. 3 is a diagram showing the typical characteristics of the p- and s-polarized light.
Figure 4:
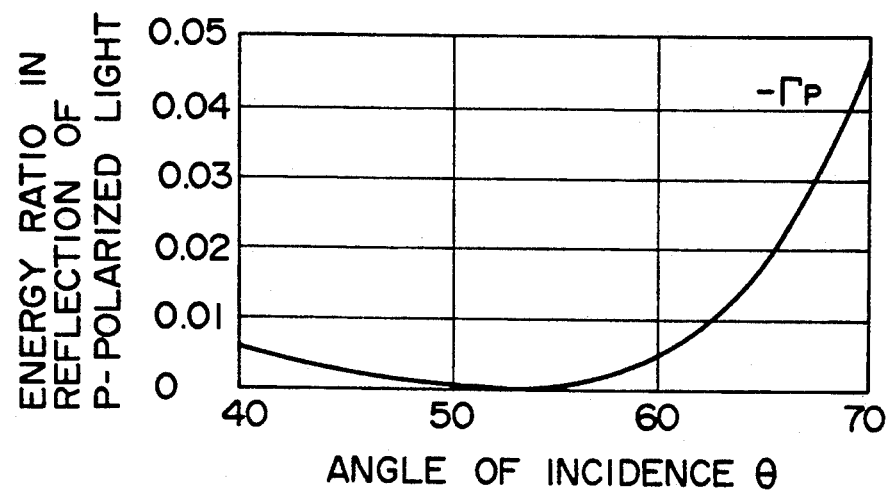
FIG. 4 is a diagram showing the relation between the incidence angle of the p-polarized light and the reflected energy thereof.
Figure 5:
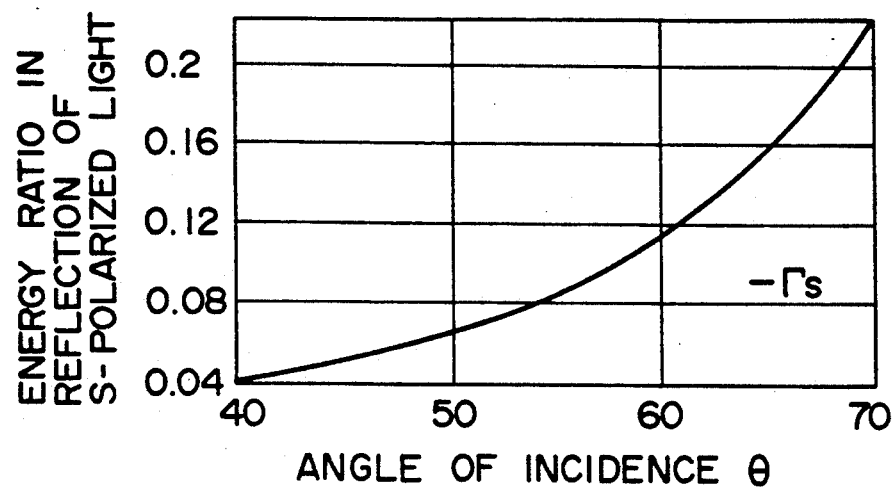
FIG. 5 is a diagram showing the relation between the incidence angle of the s-polarized light and the reflected energy thereof.
Figure 6:
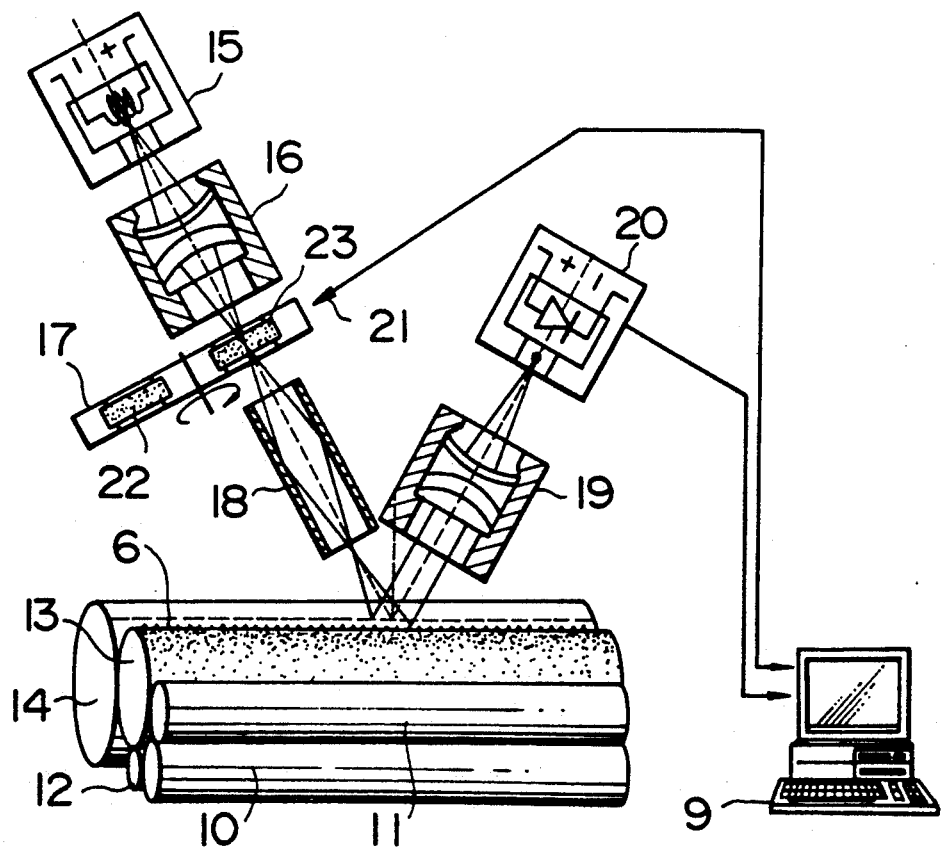
FIG. 6 is a schematic diagram of a conventional on-plate water film sensor.

Shown in FIG. 3 are the physical properties which the p- and s-polarized light exhibits at the Brewster angle. FIG. 4 shows the relation between the incidence angle of p-polarized light and the energy ratio in the reflection of the light. FIG. 5 illustrates the relation between the incidence angle of s-polarized light and the energy ratio in reflection thereof. FIG. 2 shows the relation between measured signals and the thickness F of water films formed at an area without picture or line (non-picture portion) on the plate (difference in the amounts of the received s- and p-polarized beams).

It is now noted that since the light which is transmitted through a water film (p-polarized light) undergoes irregular reflection due to the surface roughness of the plate, the detected intensity of the light is small. It is likewise noted that because the s-polarized light reflects specularly at the surface of a water film, the detected intensity is large. The reason behind the need to take the difference between the received photo intensities of the s- and p-polarized beams is to compensate for the surface roughness of the plate.

(i) Because the cross-sectional diameter of a laser beam can be narrowed down to the order of several microns, whereby the area of measurement for the water film thickness can also be reduced (in this embodiment, the laser beam used had a cross-sectional diameter of 1.0 mm).

(ii) While a mechanical chopper generally has a chopper speed of 0 Hz to 100 Hz, the chopper using the electro-optical effect has a frequency range of 0 Hz through 50 kHz (in this embodiment, the measurement was done at 30 kHz).

Using narrowed light rays and a high-speed chopper, the pattern of a very thin water film with a thickness corresponding to a screen dot size (some tens of micrometers) can possibly be measured.

It is further noted that though the embodiment involving the use of a laser has thus far been described, the configuration of the present invention is by no means restricted to a laser, but can be adopted for other light sources of narrow-band such as a light emitting diode (LED) and so forth.

The on-plate water film sensor for printing machines of the present invention comprises a narrow-band light source, a photo modulator to chop the light beam from the light source into a p- and an s-polarized beams, a collimator for making the light rays of the polarized beams parallel to each other with a given cross-sectional area for measurement, a wavelength plate to adjust the wavefront of the collimated parallel rays, and a device for receiving the light which has been reflected specularly from the plate and for calculating the thickness of a water film formed on a plate. This sensor can achieve the following effects:

(1) The area of measuring the water film thickness can be reduced so that the width of measurement can be narrowed down to be less than the width of water lining;

(2) The chopper speed can be accelerated so that the measurement may respond properly to changes in a water film pattern; and (3) As a result of the above-described effects (1) and (2), the measurement of changes in a water film pattern has become possible.

We claim:

1. A sensor for measuring the thickness of a water film formed on a plate in a printing machine, comprising a narrow-band light source, a photo modulator for alternatively chopping light from the light source into p-polarized and s-polarized beams, a collimator for making rays of the chopped beams parallel to each other with a given cross-sectional area for measurement, a wave-length plate for adjusting wavefront of the collimated parallel rays and directing the parallel rays onto the water film at a selected angle of incidence, and a device for receiving light beams reflected specularly from the plate and for calculating the thickness of a water film formed on the plate.

2. The sensor as defined in claim 1, wherein said photo modulator is a chopper using an electro-optical effect.

3. The sensor as defined in claim 1, wherein the angle of incidence of the collimated parallel rays and a plane perpendicular to the plate is a Brewster angle.

4. The sensor as defined in any one of claims 1 to 3, wherein said narrow-band light source is a laser.

5. The sensor as defined in any one of claims 1 to 3, wherein said narrow-band light source is a light emitting diode (LED).

* * * * *